US012789805B2

(12) United States Patent
Nilsson et al.

(10) Patent No.: US 12,789,805 B2
(45) Date of Patent: Nov. 10, 2026

(54) INITIATING A SAFETY PROCEDURE FOR DECELERATING A VEHICLE

(71) Applicant: Volvo Car Corporation, Gothenburg (SE)

(72) Inventors: Emma Nilsson, Gothenburg (SE); Mirta Zelenika Zeba, Gothenburg (SE); Bo Svanberg, Gothenburg (SE); Magnus Björklund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/947,300

(22) Filed: Nov. 14, 2024

(65) Prior Publication Data

US 2025/0206304 A1 Jun. 26, 2025

(30) Foreign Application Priority Data

Dec. 22, 2023 (EP) .................................... 23219917

(51) Int. Cl.
*B60W 30/14* (2006.01)
*B60W 50/00* (2006.01)

(52) U.S. Cl.
CPC ...... *B60W 30/146* (2013.01); *B60W 50/0098* (2013.01); *B60W 2520/105* (2013.01); *B60W 2540/221* (2020.02); *B60W 2540/223* (2020.02); *B60W 2540/225* (2020.02); *B60W 2540/229* (2020.02); *B60W 2540/30* (2013.01)

(58) Field of Classification Search
CPC .... B60T 7/12; B60T 2201/022; B60W 30/08; B60W 30/0956; B60W 30/095; B60W 30/09; B60W 10/04; B60W 50/14; B60W 60/001; B60W 2554/804; G01S 13/931; G01S 2013/9319; G01S 2013/93271; G01S 2013/93272; B60R 21/013
See application file for complete search history.

(56) References Cited

U.S. PATENT DOCUMENTS

| | | | | |
|---|---|---|---|---|
| 2018/0037112 | A1* | 2/2018 | Otake ................. | B60W 10/182 |
| 2020/0122773 | A1* | 4/2020 | Deshpande ............... | B60T 7/12 |
| 2021/0370950 | A1 | 12/2021 | Ghosh et al. | |

FOREIGN PATENT DOCUMENTS

| | | | |
|---|---|---|---|
| DE | 10 2013 009 339 | A1 | 12/2014 |
| EP | 4 046 888 | A1 | 8/2022 |

OTHER PUBLICATIONS

Extended European Search Report received for European Patent Application Serial No. 23219917.4 dated May 23, 2024, 9 pages.

(Continued)

*Primary Examiner* — Erin M Piateski
*Assistant Examiner* — John C Merino
(74) *Attorney, Agent, or Firm* — Amin, Turocy & Watson, LLP

(57) ABSTRACT

The disclosure relates to initiating a safety procedure for decelerating a vehicle. A corresponding method can comprise obtaining, by a device comprising a processor, first data indicative of at least one driving parameter of the vehicle, obtaining, by the device, second data indicative of a driver awareness of a driver of the vehicle, initiating, by the device, a driver responsiveness check based on the first data and the second data, and initiating, by the device, the safety procedure if the driver responsiveness check is indicative of a fail of the driver responsiveness check.

20 Claims, 2 Drawing Sheets

(56) References Cited

OTHER PUBLICATIONS

Communication pursuant to Article 94(3) EPC for EP Application No. 23 219 917.4 dated Feb. 27, 2026.
Communication pursuant to Article 94(3) EPC for EP Application No. 23 219 917.4 dated Jul. 27, 2026.

* cited by examiner

INITIATING A SAFETY PROCEDURE FOR DECELERATING A VEHICLE

CROSS REFERENCE TO RELATED APPLICATIONS

This application claims the benefit of and priority to pending EP patent application Ser. No. 23/219,917.4, filed Dec. 22, 2023, and entitled “METHOD FOR INITIATING A SAFETY PROCEDURE FOR DECELERATING A VEHICLE,” the entirety of which is hereby incorporated by reference herein.

TECHNICAL FIELD

The present disclosure relates to vehicles and, more particularly, to initiating a safety procedure for decelerating a vehicle.

BACKGROUND

When drivers of vehicles suffer sudden illness (e.g., heart failure, syncope, seizure), they may unintentionally press the gas pedal, leading to unwanted accelerations. Such unintentional pressing of the gas pedal can also override vehicle interventions. For example, such an intervention may be automatic emergency braking, which may be overridden if the gas pedal is pressed above a certain threshold.

While abnormal driving behaviors and driver states can be detected using in-vehicle sensors, vehicles are often either too slow to react by initiating a safety procedure for stopping the vehicle or alternatively, prematurely initiate a safety procedure, i.e., without the driver suffering a sudden illness. The first alternative does not increase the safety as much as it is desired, while in the second alternative of false positive triggers of safety procedures, the driving experience of a healthy driver is significantly interrupted by prematurely forcing the vehicle to a stop.

SUMMARY

The problem is at least partially solved or alleviated by the subject matter of the independent claims of the present disclosure, wherein further examples are incorporated in the dependent claims.

According to a first aspect of this disclosure, there is provided a method for initiating a safety procedure for decelerating a vehicle, wherein the method comprises:

- obtaining first data indicative of at least one driving parameter of the vehicle,
- obtaining second data indicative of a driver awareness of a driver of the vehicle,
- initiating a driver responsiveness check based on the first data and the second data, and
- initiating the safety procedure if the driver responsiveness check is indicative of a fail of the driver responsiveness check.

Accordingly, the method provides for initiating a safety procedure for decelerating a vehicle based on the driving of the vehicle and a driver awareness of the driver of the vehicle. However, in various embodiments, the safety procedure is only initiated after a driver responsiveness check is initiated based on the driving of the vehicle and driver awareness, and if the driver responsiveness check is indicative of a fail thereof or, in other words, a result of the driver responsiveness check is a fail or indicative of a fail. Thereby, false positive triggers of safety procedures may be avoided or at least reduced. If the driver responsiveness check is passed, the safety procedure may not be initiated, i.e., the driving of the vehicle may be continued, e.g., in an automated or manual control by the driver. Alternatively, when the driver responsiveness check is failed, the safety procedure is initiated. For example, a control signal indicative of the safety procedure may be provided for controlling the vehicle such that the safety procedure for decelerating the vehicle is being carried out.

For example, the deceleration may be carried out by means of using the friction brakes of the vehicle, using a motor brake of the vehicle and/or one-pedal drive, e.g., in case of an electric vehicle. In various embodiments, the vehicle may be a motor vehicle, e.g., an internal combustion engine vehicle or an electric vehicle. The vehicle may be a passenger car, for example. In various embodiments, the vehicle may be configured for at least partial autonomous driving. In other words, the vehicle may be an at least partially autonomous vehicle. In particular, the vehicle may at least decelerate, in particular stop, e.g., by emergency or controlled braking, and/or change lanes autonomously for performing the safety procedure.

For example, the initiating of the driver responsiveness check may be provided by executing data configured for carrying out the driver responsiveness check. In various embodiments, the driver responsiveness check may be carried out at least partially on any visual, acoustical or similar system of the vehicle, e.g., comprising a display interface, a voice interface, or any other user interface for receiving an input as response to the driver responsiveness check.

For initiating the driver responsiveness check, the first data and the second data are considered. For example, at least one threshold and/or at least one criterion for the first data and/or the second data may be compared to the first data and/or the second data, in particular the at least one driving parameter and/or the driver awareness, in particular at least one driver awareness parameter. When the threshold(s) and/or criterion(s) are met or exceeded, the driver responsiveness check may be initiated and carried out. If they are not met or not exceeded, the driver responsiveness check may not be carried out and the driver will not be bothered with the driver responsiveness check. Accordingly, the driver responsiveness check may serve as an additional determinant for determining that the vehicle is being operated in an unsafe manner, e.g., due to sudden illness of the driver, and should be decelerated, in particular be brought to a stop, to prevent an accident.

The method may be at least partly computer implemented. Accordingly, one, multiple or all of the steps of the method may be carried out by a computer (e.g., comprising a processor and a memory) or another suitable device (e.g., comprising a processor and a memory). In various embodiments, the method may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

According to an example, the at least one driving parameter may be at least one from a speed and an acceleration of the vehicle. For example, the speed and/or the acceleration may be determined based on a gas pedal pressure or, in other words, gas pedal depression, as may be measured by a gas pedal sensor, for example. Alternatively, or additionally, the speed and/or the acceleration may be measured in any other way, e.g., by one or more wheel speed sensors, a GPS sensor, or similar. High speeds and/or high accelerations may be indicative of an unaware, e.g., ill, driver, keeping their foot on the gas pedal and increasing the speed of the vehicle in an uncontrolled manner. Accordingly, e.g., by setting a threshold and/or criterion as explained above, it may be possible to increase the likelihood that the safety procedure is being initiated when the driver is unaware.

According to an example, the method may comprise setting a limit for at least one of a speed and an acceleration of the vehicle based on the first data and the second data. In particular, when the threshold(s) and/or criterion(s) as described above are met, the limit may be set. The same threshold(s) and/or criterion(s) for setting the limit and for initiating the driver responsiveness check may apply. In particular, the limit may be set, when the driver responsiveness check is initiated. However, the limit may be set before, during or after initiating the driver responsiveness check. Thereby, while the driver responsiveness check is being carried out, the driver may be restricted to increase the speed and/or acceleration of the vehicle above the limit. This may be seen as a first measure for preventing an accident of the vehicle when the driver should be unaware. However, it is a much less restrictive measure than the safety procedure, which is only carried out after the driver responsiveness check fails, i.e., the driver does not or not correctly respond to the driver responsiveness check. Still, the limit may substantially help preventing accidents because if the safety procedure will be carried out, it will need to decelerate the vehicle from the speed at the set limit instead of a higher speed, which gives valuable time to prevent any accident to the vehicle.

According to an example, the method may comprise disabling the limit if the driver responsiveness check is indicative of a pass of the driver responsiveness check or, in other words, the result of the driver responsiveness check is a pass or indicative of a pass. Accordingly, the full control or capability of the driving of the vehicle in terms of speed and/or acceleration is handed back to the driver once it is assured that he is aware and that the driver responsiveness check was triggered by a reason not requiring the safety procedure, e.g., the driver being distracted for a short time or similar. Thereby, the limitation of the speed and/or the acceleration is only for a short period of time in case of driver responsiveness checks with a pass result and more likely to be accepted as a safety feature by the driver.

According to an example, the method may comprise initiating outputting of at least one signal indicative of the limit by at least one user interface of the vehicle. The user interface may be any interface by means of which the user or driver of the vehicle may be informed about the set limit, e.g., at least one display, e.g., for infotainment, dashboard and/or as head-up display, at least one speaker or similar. Accordingly, the signal may be output as a visual signal, e.g., in the form of text and/or image or icon, and/or as an acoustic signal, for example. Hence, it is avoided that the driver, should he be aware, is surprised by the set limit or erroneously considers a malfunction of the vehicle or similar.

According to an example, the method may comprise disabling deactivation of at least one safety system of the vehicle and/or enabling at least one safety system of the vehicle. Examples of such safety system may be an automatic emergency braking, a collision warning system, e.g., front collision warning, adaptive cruise control systems, or similar. One or more different safety systems may be disabled for deactivation, while another one or more safety systems may be enabled, for example. In particular, when the threshold(s) and/or criterion(s) as described above are met (e.g., satisfied), the disabling of the deactivation and/or the enabling of the at least one safety system may be carried out. The same threshold(s) and/or criterion(s) for the disabling of deactivation and/or enabling of the at least one safety system and for initiating the driver responsiveness check may apply. In particular, the disabling of deactivation and/or enabling may be carried out when the driver responsiveness check is initiated. However, the disabling and/or enabling may be carried out before, during or after initiating the driver responsiveness check. Thereby, by enforcing the one or more safety systems, the safety during the unaware driving of the driver or, at least during the time of the driver responsiveness check, may be increased.

According to an example, the initiating of the driver responsiveness check may be further based on the at least one driving parameter exceeding a driving parameter threshold for a time period and/or at least one driver awareness parameter of the second data exceeding the driver awareness threshold or meeting a driver awareness criterion for a time period. In various embodiments, the time periods may be the same. In various embodiments, the time period or time periods may be predefined. In various embodiments, the driving parameter threshold may be a driving speed, e.g., above 80 km/h, above 100 km/h or above 120 km/h, for example. The driver awareness parameter may be determined, for instance, based on one or more measurements, e.g., of a heartbeat, a breathing rate, and similar and/or pictures of the driver, e.g., showing a facial expression, direction of gaze, and similar, as may be taken from a camera inside the vehicle, for example. For example, the time periods may be within a range of 3 to 60 seconds, in particular 5 to 50 seconds, further in particular 7 to 45 seconds.

According to an example, the driver responsiveness check may be configured for outputting at least one signal indicative of the driver responsiveness check by at least one user interface of the vehicle. In various embodiments, the user interface may be any interface by means of which driver of the vehicle may be informed about the driver responsiveness check, e.g., at least one display, e.g., for infotainment, dashboard and/or as head-up display, at least one speaker or similar. For example, the signal may be or may be configured as a task or information about the initiated driver responsiveness check requiring input or a response from the driver, e.g., by pressing a touch-display.

According to an example, the driver responsiveness check may be configured such that it is being passed if a response from the driver is received by at least one user interface of the vehicle within a time limit after the at least one signal has been output and it is being failed if a response from the driver is not received by the at least one user interface within the time limit. For example, the time limit may be predefined. For example, the limit may be within a range of 1 to 8 seconds, in particular 2 to 6 seconds, further in particular 3 to 5 seconds, e.g., about 3 seconds. It may further be provided that the driver responsiveness check is failed if a responsive from the driver is incorrect. For example, the driver responsiveness check may be configured such that a specific response is required. For example, there may be two or more types of responses or two or more possibilities of responding to the signal, where only one of the responses is correct and the other one is incorrect. The incorrect response indicates that the user is actually unaware despite responding to the driver responsiveness check. In this case, the driver responsiveness check may still fail. The user interface for receiving the response may be the same as the one putting out the signal indicative of the driver responsiveness check or a different one, e.g., being a microphone or a camera or sensor for gesture recognition. For example, the response may be a touch of one or more buttons or sections on a touch display as user interface, one or more voice responses via the microphone, a hand gesture or other gesture, or similar. Further, alternatively, the user interface may be the gas pedal, a brake pedal, a steering wheel and/or any other user interface for controlling the vehicle. The driver responsiveness check may require the driver to perform a driving action as response, e.g., using the brake pedal, stepping of the gas pedal, switching lanes with the steering wheel or similar. In case the user interface for the output of the signal and the user interface for receiving the response from the driver are different, the user interface of the output of the signal may also be referred to as an output user interface, while the user interface for receiving the response may also be referred to as an input or response user interface.

According to an example, the second data may be indicative of the driver awareness of the driver during acceleration of the vehicle and/or during a time at which the at least one driving parameter exceeds a driving parameter threshold. Additionally, or alternatively, the second data may be obtained at a time after the at least one driving parameter exceeds the driving parameter threshold. Thereby, the second data may not be permanently obtained. Instead, the second data may only be obtained, when necessary, e.g., at high speeds.

According to an example, the driver awareness may relate to one or more of the driver having or not having hands on a steering wheel of the vehicle, a steering behavior of the driver, the driver looking onto a road being travelled by the vehicle or not, a posture of the driver, a facial color of the driver, a gaze behavior of the driver, a heart rate of the driver, a breathing behavior of the driver, a blood pressure of the driver, and/or a facial expression of the driver. In particular, the at least one driver awareness parameter may be indicative of one or more of the driver having or not having hands on a steering wheel of the vehicle, a steering behavior of the driver, the driver looking onto a road being travelled by the vehicle or not, a posture of the driver, a facial color of the driver, a gaze behavior of the driver, a heart rate of the driver, a breathing behavior of the driver, a blood pressure of the driver, and/or a facial expression of the driver. Any of the aforementioned may be detected by a camera, sensor, or user interface, for example. For example, at least whether or not the driver has his hands on the steering wheel of the vehicle, whether the driver is looking onto a road being travelled by the vehicle or not, a posture of the driver, a facial color of the driver, a gaze behavior of the driver, and/or a facial expression of the driver may be detected by an interior camera of the vehicle, which may take pictures and/or record video of the driver during driving. For example, image processing of these pictures and/or video may be carried out for detecting any of the aforementioned. For example, a heart rate of the driver, a breathing behavior of the driver, and/or the blood pressure of the driver may be detected by a sensor of the vehicle itself or a vehicle external sensor, e.g., of a watch of the driver, which may be communicatively couplable to the vehicle.

According to an example, the safety procedure may be configured for stopping the vehicle. In particular, the safety procedure may be configured such that the stopping of the vehicle is carried out in a traffic free zone. For this purpose, the method may further comprise determining a traffic free zone, in particular ahead of the vehicle, and driving the vehicle towards it for stopping it there, e.g., by steering it into a shoulder of a road lane.

According to a second aspect, there is provided a computer program product comprising instructions which, when the program is executed by a computer, cause the computer to carry out the method according to the first aspect of this disclosure.

For example, the computer program product may be a computer program as such or a product, on which the computer program may be stored, e.g., a computer-readable storage medium.

According to a third aspect, there is provided a data processing apparatus comprising means for carrying out the method of the first aspect of this disclosure. The data processing apparatus may be a computer or control unit of the vehicle, for example. The means may be suitable processing means and/or the computer program product, for example.

According to a fourth aspect, there is provided a vehicle comprising the data processing apparatus of the third aspect of this disclosure.

The vehicle may further comprise the elements or systems as described herein, e.g., the user interface or user interfaces, the safety system or safety systems, one or more sensors and/or cameras, the computer program product, and/or the data processing apparatus.

It should be noted that the above examples may be combined with each other irrespective of the aspect involved. Accordingly, the method may be combined with structural features and, likewise, the computer program product, data processing apparatus, and vehicle may be combined with features described above with regard to the method.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

DETAILED DESCRIPTION

The Figures are merely schematic representations and serve only to illustrate examples of the disclosure. Identical or equivalent elements are in principle provided with the same reference signs.

Figure 1:
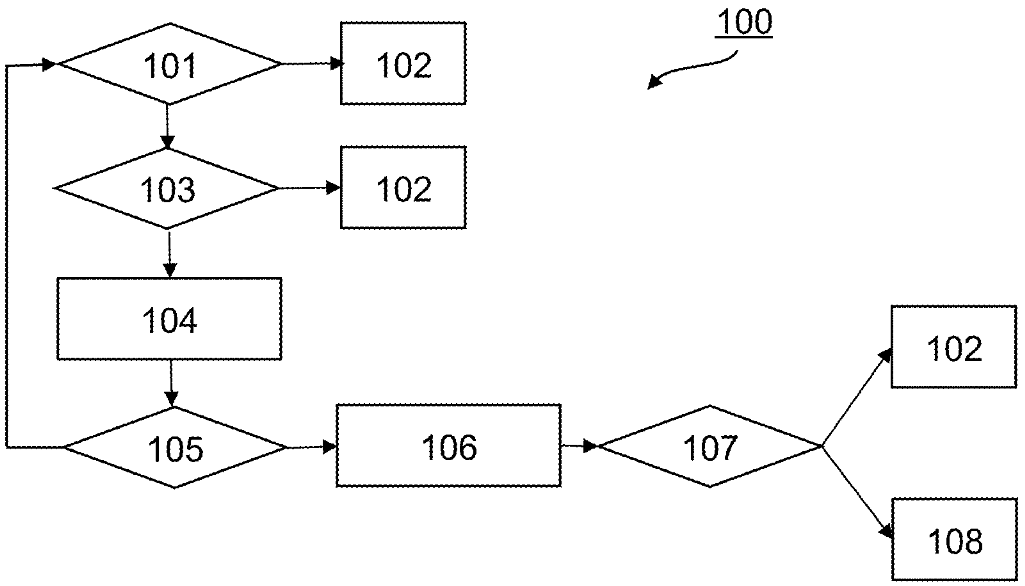
FIG. 1 shows a schematic illustration of a method according to an example of this disclosure.
Figure 2:
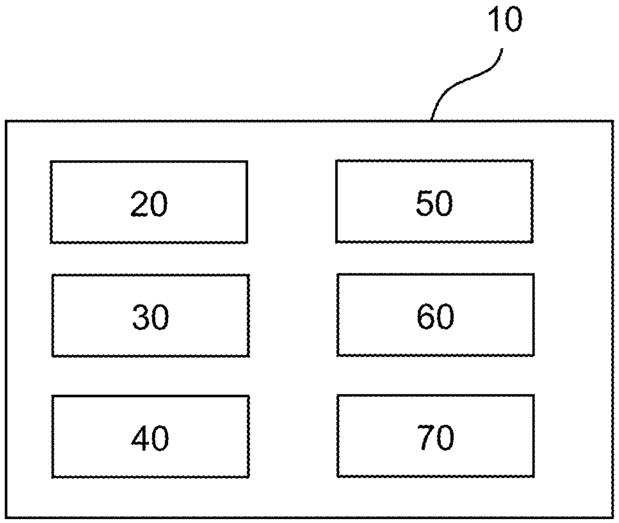
FIG. 2 shows a schematic illustration of a vehicle for carrying out the method of FIG. 1.

FIG. 1 shows a method 100 for initiating a safety procedure for decelerating the vehicle 10 as schematically shown in FIG. 2. The method 100 may be carried out based on instructions stored on a computer program product 60 of the vehicle 10, in particular by a data processing apparatus 70, which may be a computer.

In a first step 101 of method 100, the first data indicative of at least one driving parameter of the vehicle 10 is being determined. For example, the at least one driving parameter may be at least one from a speed and an acceleration of the vehicle 10. This determination may be based, for example, on a gas pedal pressure or depression. The gas pedal of the vehicle 10 may be one user interface 20, in particular an input user interface, of the vehicle 10, by means of which the driver of the vehicle 10 may provide input to the vehicle 10, in this example in form of an acceleration request.

Further, in, before and/or after the first step 101 of method 100, the at least one driving parameter is compared to a driving parameter threshold. As long as the threshold is not exceeded, the driver of the vehicle 10 is further provided with a full capability 102 for controlling the vehicle 10.

In a second step 103 of method 100, second data indicative of a driver awareness, e.g., one or more driver awareness parameters, of the driver of the vehicle 10 is obtained. Second step 103 may be dependent on first step 101, in particular in that it may be required that the driving parameter threshold is exceeded to carry out step 103. The full capability may comprise at least that the driver may accelerate the vehicle 10 as he desires and only limited by the technical capabilities of the vehicle 10.

The second data may be obtained from a driver awareness system 50, which may comprise one or more sensors or cameras, for example. For example, the driver awareness system 50 may comprise an interior or cabin camera for monitoring the driver and/or other passengers of the vehicle 10. Thereby, the driver awareness system 50 may for example determine whether the driver has his hands on a steering wheel of the vehicle 10 or not, is looking onto a road being travelled by the vehicle 10 or not, and/or optional determine the posture, facial color, gaze behavior of the driver, and/or facial expression of the driver. Based on that, the driver awareness system 50 may determine how aware the driver is.

Similar to the first step 101, in, before and/or after the second step 103 of method 100, the at least one driver awareness parameter may be compared to a driver awareness parameter threshold or criterion. As long as the threshold is not exceeded or the criterion is not met, the driver of the vehicle 10 is further provided with a full capability 102 for controlling the vehicle 10.

If both thresholds are exceeded, then the method 100 may continue with the third step 104. In the optional third step 104, a warning or information may be output to the driver, e.g., via a user interface 30 of the vehicle 10, which may be an output user interface 30 such as but not limited to a display, for example. Additionally, or alternatively, in the third step 104, a limit for at least one of a speed and an acceleration of the vehicle 10 may be set and a corresponding signal indicative thereof may be output via the user interface 30. Accordingly, the driver is not anymore provided with a full capability to drive the vehicle 10, but limited at least in the speed and/or acceleration of the vehicle 10. Also, additionally, or alternatively, in the third step 104, it may be disabled that at least one safety system 40 of the vehicle 10 may be deactivated and/or the at least one safety system 40 or another safety system 40 of the vehicle 10 may be enabled.

Then, in an optional fourth step 105, it may be checked whether the at least one driving parameter exceeds the driving parameter threshold for a predefined time period, e.g., of at least 3 seconds, and/or the at least one driver awareness parameter of the second data exceeds the driver awareness threshold or meets a driver awareness criterion for the predefined time period. If one or both thresholds are exceeded for the predefined time period, a driver responsiveness check 106 may be initiated. The driver may be required to respond to the driver responsiveness check 106 via the user interface 20, which may be announced to him via the user interface 30, for example, e.g., by lifting the foot from the gas pedal. Alternatively, another user interface 20 may be used for receiving the response, e.g., in the form of the user interface 30, i.e., a display on which the driver may press a virtual button indicating that he is capable to drive further, for example.

The driver responsiveness check 106 may for example be configured such that it is being passed if a response from the driver is received by the user interface 20, 30 of the vehicle 10 within a predefined time limit after putting out the signal regarding the limitation of the speed of the vehicle 10, and it is being failed if a response from the driver is not received by the user interface 20, 30 within the time limit.

In case the driver responsiveness check 106 has a pass as a result 107 of the driver responsiveness check, the method 100 proceeds to giving the driver back the full capability 102 to drive the vehicle 10, i.e., removes the speed limit. However, if the driver responsiveness check 106 has a fail as the result 107, the method 100 proceeds to a safety procedure 108 for decelerating, in particular stopping, the vehicle 10.

Figure 3:
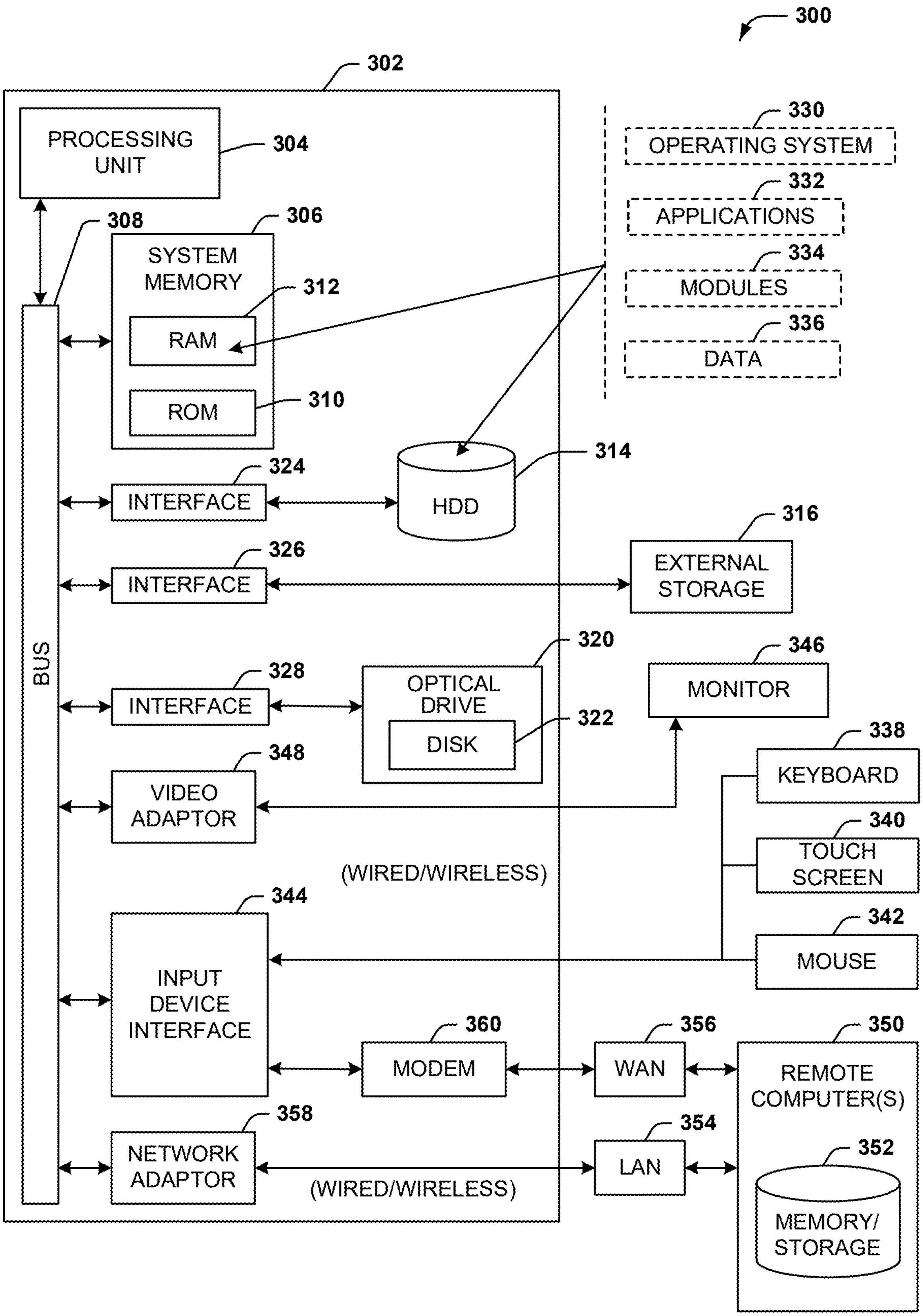
FIG. 3 is an example, non-limiting computing environment in which one or more embodiments described herein can be implemented.

In order to provide additional context for various embodiments described herein, FIG. 3 and the following discussion are intended to provide a brief, general description of a suitable computing environment 300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers (e.g., ruggedized personal computers), field-programmable gate arrays, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media, machine-readable storage media, and/or communications media, which two terms are used herein differently from one another as follows. Computer-readable storage media or machine-readable storage media can be any available storage media that can be accessed by the computer and comprises both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can comprise, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprise any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, optic, infrared, and other wireless media.

With reference again to FIG. 3, the example environment 300 for implementing various embodiments of the aspects described herein comprises a computer 302 (e.g., a controller), the computer 302 including a processing unit 304, a system memory 306 and a system bus 308. The system bus 308 couples system components including, but not limited to, the system memory 306 to the processing unit 304. The processing unit 304 can be any of various commercially available processors, field-programmable gate array, AI accelerator application-specific integrated circuit, or other suitable processors. Dual microprocessors and other multi-processor architectures can also be employed as the processing unit 304.

The system bus 308 can be any of several types of bus structure that can further interconnect to a memory bus (with or without a memory controller), a peripheral bus, and a local bus using any of a variety of commercially available bus architectures. The system memory 306 comprises ROM 310 and RAM 312. A basic input/output system (BIOS) can be stored in a non-volatile memory such as ROM, erasable programmable read only memory (EPROM), EEPROM, which BIOS contains the basic routines that help to transfer information between elements within the computer 302, such as during startup. The RAM 312 can also comprise a high-speed RAM such as static RAM for caching data. It is noted that unified Extensible Firmware Interface(s) can be utilized herein.

The computer 302 further comprises an internal hard disk drive (HDD) 314 (e.g., EIDE, SATA), one or more external storage devices 316 (e.g., a magnetic floppy disk drive (FDD) 316, a memory stick or flash drive reader, a memory card reader, etc.) and an optical disk drive 320 (e.g., which can read or write from a disk 322 such as a CD-ROM disc, a DVD, a BD, etc.). While the internal HDD 314 is illustrated as located within the computer 302, the internal HDD 314 can also be configured for external use in a suitable chassis (not shown). Additionally, while not shown in environment 300, a solid-state drive (SSD) could be used in addition to, or in place of, an HDD 314. The HDD 314, external storage device(s) 316 and optical disk drive 320 can be connected to the system bus 308 by an HDD interface 324, an external storage interface 326 and an optical drive interface 328, respectively. The interface 324 for external drive implementations can comprise at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 312, including an operating system 330, one or more application programs 332, other program modules 334 and program data 336. All or portions of the operating system, applications, modules, and/or data can also be cached in the RAM 312. The systems and methods described herein can be implemented utilizing various commercially available operating systems or combinations of operating systems.

Computer 302 can optionally comprise emulation technologies. For example, a hypervisor (not shown) or other intermediary can emulate a hardware environment for operating system 330, and the emulated hardware can optionally be different from the hardware illustrated in FIG. 3. In such an embodiment, operating system 330 can comprise one virtual machine (VM) of multiple VMs hosted at computer 302. Furthermore, operating system 330 can provide runtime environments, such as the Java runtime environment or the .NET framework, for applications 332. Runtime environments are consistent execution environments that allow applications 332 to run on any operating system that comprises the runtime environment. Similarly, operating system 330 can support containers, and applications 332 can be in the form of containers, which are lightweight, standalone, executable packages of software that comprise, e.g., code, runtime, system tools, system libraries and settings for an application.

Further, computer 302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 302, e.g., applied at the application execution level or at the operating system (OS) kernel level, thereby enabling security at any level of code execution.

A user can enter commands and information into the computer 302 through one or more wired/wireless input devices, e.g., a keyboard 338, a touch screen 340, and a pointing device, such as a mouse 342. Other input devices (not shown) can comprise a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, weights sensors, crash sensors, or the like. These and other input devices are often connected to the processing unit 304 through an input device interface 344 that can be coupled to the system bus 308, but can be connected by other interfaces, such as a parallel port, an IEEE 1394 serial port, a game port, a USB port, an IR interface, a BLUETOOTH® interface, etc.

A monitor 346 or other type of display device can be also connected to the system bus 308 via an interface, such as a video adapter 348. In addition to the monitor 346, a computer typically comprises other peripheral output devices (not shown), such as speakers, printers, etc.

The computer 302 can operate in a networked environment using logical connections via wired and/or wireless communications to one or more remote computers, such as a remote computer(s) 350. The remote computer(s) 350 can be a workstation, a server computer, a router, a personal computer, portable computer, microprocessor-based entertainment appliance, a peer device or other common network node, and typically comprises many or all of the elements described relative to the computer 302, although, for purposes of brevity, only a memory/storage device 352 is illustrated. The logical connections depicted comprise wired/wireless connectivity to a local area network (LAN) 354 and/or larger networks, e.g., a wide area network (WAN) 356. Such LAN and WAN networking environments are commonplace in offices and companies, and facilitate enterprise-wide computer networks, such as intranets, all of which can connect to a global communications network, e.g., the Internet.

When used in a LAN networking environment, the computer 302 can be connected to the local network 354 through a wired and/or wireless communication network interface or adapter 358. The adapter 358 can facilitate wired or wireless communication to the LAN 354, which can also comprise a wireless access point (AP) disposed thereon for communicating with the adapter 358 in a wireless mode.

When used in a WAN networking environment, the computer 302 can comprise a modem 360 or can be connected to a communications server on the WAN 356 via other means for establishing communications over the WAN 356, such as by way of the Internet. The modem 360, which can be internal or external and a wired or wireless device, can be connected to the system bus 308 via the input device interface 344. In a networked environment, program modules depicted relative to the computer 302 or portions thereof, can be stored in the remote memory/storage device 352. It will be appreciated that the network connections shown are example and other means of establishing a communications link between the computers can be used.

When used in either a LAN or WAN networking environment, the computer 302 can access cloud storage systems or other network-based storage systems in addition to, or in place of, external storage devices 316 as described above. Generally, a connection between the computer 302 and a cloud storage system can be established over a LAN 354 or WAN 356 e.g., by the adapter 358 or modem 360, respectively. Upon connecting the computer 302 to an associated cloud storage system, the external storage interface 326 can, with the aid of the adapter 358 and/or modem 360, manage storage provided by the cloud storage system as it would other types of external storage. For instance, the external storage interface 326 can be configured to provide access to cloud storage sources as if those sources were physically connected to the computer 302.

The computer 302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can comprise Wireless Fidelity (Wi-Fi) and BLUETOOTH® wireless technologies. Thus, the communication can be a predefined structure as with a conventional network or simply an ad hoc communication between at least two devices.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one example, to at least one, optionally including more than one, A, with no B present (and optionally including entities other than B); in another example, to at least one, optionally including more than one, B, with no A present (and optionally including entities other than A); in yet another example, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS

10 vehicle
20 input user interface
30 output user interface
40 safety system
50 driver awareness system
60 computer program product
70 data processing apparatus
100 method
101 first step
102 full capability
103 second step
104 third step
105 fourth step
106 driver responsiveness check
107 result of driver responsiveness check
108 safety procedure

What is claimed is:

1. A method for initiating a safety procedure for decelerating a vehicle, comprising:

obtaining, by a device comprising a processor, first data indicative of at least one driving parameter of the vehicle;

obtaining, by the device, second data indicative of a driver awareness of a driver of the vehicle;

initiating, by the device, a driver responsiveness check based on the first data and the second data, wherein initiating the driver responsiveness check comprises outputting at least one signal indicative of the driver responsiveness check by a touch display of the vehicle; and initiating, by the device, the safety procedure if the driver responsiveness check is indicative of a fail of the driver responsiveness check, wherein the driver responsiveness check is indicative of a pass of the driver responsiveness check if a response from the driver is received by the touch display within a time limit after the at least one signal has been output, and is indicative of a fail of the driver responsiveness check if a response from the driver is not received by the touch display within the time limit.

2. The method according to claim 1, wherein the at least one driving parameter is at least one of a speed or an acceleration of the vehicle.

3. The method according to claim 1, further comprising:

setting, by the device, a limit for at least one of a speed or an acceleration of the vehicle based on the first data and the second data, and wherein the limit is set in response to initiating the driver responsiveness check.

4. The method according to claim 3, further comprising:

disabling, by the device, the limit if the driver responsiveness check is indicative of a pass of the driver responsiveness check.

5. The method according to claim 3, further comprising:

initiating, by the device, outputting of at least one signal indicative of the limit by at least one user interface of the vehicle.

6. The method according to claim 1, further comprising:

based on the first data or the second data:

disabling, by the device, deactivation of at least one safety system of the vehicle, or enabling, by the device, at least one safety system of the vehicle.

7. The method according to claim 1, wherein the initiating of the driver responsiveness check is further based on:

the at least one driving parameter exceeding a driving parameter threshold for a time period, or at least one driver awareness parameter of the second data exceeding a driver awareness threshold or satisfying a driver awareness criterion for a time period.

8. The method according to claim 1, wherein the second data is indicative of the driver awareness of the driver during acceleration of the vehicle or during a time at which the at least one driving parameter exceeds a driving parameter threshold.

9. The method according to claim 1, wherein the driver awareness relates to one or more of the driver having or not having hands on a steering wheel of the vehicle, a steering behavior of the driver, the driver looking onto a road being travelled by the vehicle or not, a posture of the driver, a facial color of the driver, a gaze behavior of the driver, a heartrate of the driver, a breathing behavior of the driver, a blood pressure of the driver, or a facial expression of the driver.

10. The method according to claim 1, wherein the safety procedure is configured for stopping the vehicle.

11. A non-transitory machine-readable medium, comprising executable instructions that, when executed by a processor, facilitate performance of operations, comprising:

obtaining first data indicative of at least one driving parameter of a vehicle;

obtaining second data indicative of a driver awareness of a driver of the vehicle;

initiating a driver responsiveness check based on the first data and the second data, wherein initiating the driver responsiveness check comprises outputting at least one signal indicative of the driver responsiveness check by a touch display of the vehicle; and initiating a safety procedure if the driver responsiveness check is indicative of a fail of the driver responsiveness check, wherein the driver responsiveness check is indicative of a pass of the driver responsiveness check if a response from the driver is received by the touch display within a time limit after the at least one signal has been output, and is indicative of a fail of the driver responsiveness check if a response from the driver is not received by the touch display within the time limit.

12. The non-transitory machine-readable medium of claim 11, wherein the operations further comprise:

setting a limit for at least one of a speed or an acceleration of the vehicle based on the first data and the second data, wherein the limit is set in response to initiating the driver responsiveness check.

13. The non-transitory machine-readable medium of claim 12, wherein the operations further comprise:

disabling the limit if the driver responsiveness check is indicative of a pass of the driver responsiveness check.

14. The non-transitory machine-readable medium of claim 12, wherein the operations further comprise:

initiating outputting of at least one signal indicative of the limit by at least one user interface of the vehicle.

15. A vehicle comprising:

at least one processor; and at least one memory that stores executable instructions that, when executed by the at least one processor, facilitate performance of operations, comprising:

obtaining first data indicative of at least one driving parameter of a vehicle;

obtaining second data indicative of a driver awareness of a driver of the vehicle;

initiating a driver responsiveness check based on the first data and the second data, wherein initiating the driver responsiveness check comprises outputting at least one signal indicative of the driver responsiveness check by a touch display of the vehicle; and initiating a safety procedure if the driver responsiveness check is indicative of a fail of the driver responsiveness check, wherein the driver responsiveness check is indicative of a pass of the driver responsiveness check if a response from the driver is received by the touch display within a time limit after the at least one signal has been output, and is indicative of a fail of the driver responsiveness check if a response from the driver is not received by the touch display within the time limit.

16. The vehicle of claim 15, wherein the at least one driving parameter is at least one of a speed or an acceleration of the vehicle.

17. The vehicle of claim 15, wherein the operations further comprise:

based on the first data or the second data:

disabling deactivation of at least one safety system of the vehicle, or enabling at least one safety system of the vehicle.

18. The vehicle of claim 15, wherein the operations further comprise:

setting a limit for at least one of a speed or an acceleration of the vehicle based on the first data and the second data, and wherein the limit is set in response to initiating the driver responsiveness check.

19. The vehicle of claim 15, wherein the operations further comprise:

disabling the limit if the driver responsiveness check is indicative of a pass of the driver responsiveness check.

20. The vehicle of claim 15, wherein the operations further comprise:

initiating outputting of at least one signal indicative of the limit by at least one user interface of the vehicle.

* * * * *